(12) United States Patent
Chrysos

(10) Patent No.: US 7,710,904 B2
(45) Date of Patent: May 4, 2010

(54) RING NETWORK WITH VARIABLE TOKEN ACTIVATION

(75) Inventor: George Chrysos, Milford, MA (US)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 11/646,874

(22) Filed: Dec. 27, 2006

(65) Prior Publication Data
US 2008/0159315 A1    Jul. 3, 2008

(51) Int. Cl.
*H04L 12/28*    (2006.01)
*H04L 12/56*    (2006.01)
(52) U.S. Cl. .................................. 370/258; 370/424
(58) Field of Classification Search ............... 370/258, 370/424
See application file for complete search history.

(56) References Cited

U.S. PATENT DOCUMENTS

| | | | | |
|---|---|---|---|---|
| 5,943,423 A | * | 8/1999 | Muftic | 705/67 |
| 6,088,360 A | * | 7/2000 | Amaral et al. | 370/412 |
| 2004/0037306 A1 | * | 2/2004 | Khan et al. | 370/437 |
| 2005/0050007 A1 | * | 3/2005 | Sampson | 707/1 |
| 2005/0207440 A1 | * | 9/2005 | Tyan et al. | 370/454 |
| 2007/0299803 A1 | * | 12/2007 | Emuchay et al. | 707/1 |

OTHER PUBLICATIONS

Korean Intellectual Patent Office, Notice of Preliminary Rejection, dated Apr. 15, 2009, in a related application.

* cited by examiner

*Primary Examiner*—Ronald Abelson
*Assistant Examiner*—Michael J Anderson
(74) *Attorney, Agent, or Firm*—Trop, Pruner & Hu, P.C.

(57) ABSTRACT

An apparatus including a ring network, a plurality of nodes on the ring network to act as senders, a node on the ring network to act as a receiver, the receiver having receiver logic to place a token on the ring, the token further having an indication of an activation status, and network logic to pass the token along the ring network from each node to the next after the token is placed on the ring network and to activate the token by setting the indication of the activation status to a value indicating that the token is active at a location on the ring determined so that over a defined period of time, the token is activated in proximity to each sender at approximately the same frequency.

23 Claims, 4 Drawing Sheets

RING NETWORK WITH VARIABLE TOKEN ACTIVATION

CROSS-REFERENCE TO RELATED APPLICATION

The present application is related to pending U.S. patent application Ser. No. 10/855,509 entitled MULTIPROCESSOR CHIP HAVING BIDIRECTIONAL RING INTERCONNECT, and pending U.S. patent application Ser. No. 10/855,483 entitled METHOD AND APPARATUS FOR SYNCHRONOUS UNBUFFERED FLOW CONTROL OF PACKETS ON A RING INTERCONNECT, and assigned to the assignee of the present invention.

BACKGROUND

Flow control mechanisms in computer networks govern the transfer of packets from a source node to a destination node (in the art, and in the following, the term source may be used interchangeably with sender, destination with receiver, and node with agent). Typical flow control mechanisms include negative-acknowledgment (NACK)/retry, drop/source-timeout/retry, credit/debit, and network buffering. Generally, a source or sending node or agent sends a packet to a destination or sink node or agent, where the destination node has a finite amount of "ingress buffering" for holding packets it has received from the source node prior to processing.

In a credit/debit flow mechanism for a network, a source node on the network keeps track of the number of buffers available at a destination node through the use of "credits" and "debits." A source node will only send a packet or, in general, data, to a destination node if the source node knows there is a free buffer available at the destination node to accept the packet. When the source node sends a packet to the destination node, the source node "debits" (decrements) a local count of the number of free buffers the destination node has available. When the destination node removes a packet from its incoming buffers, the destination node sends a "credit" message back to the source node, and the source node "credits" (increments) the local count of the number of free buffers the destination node has available.

The destination node can choose to statically allocate its buffers amongst the sending nodes, whereby a fixed number of the destination node's incoming buffers are reserved for each of the M source nodes. If the destination node has a total of N incoming buffers, it may equally allocate N/M buffer entries to each source node. This works well if traffic to the destination node from all the source nodes is exactly uniform. But any deviation from uniform traffic will cause inefficiencies in the utilization of the N buffers. A degenerate form of this design is to provide enough buffering at the destination node such that all of the packets that the source nodes may send simultaneously can be accommodated. In other words, if each of the M source nodes can have P packets in-flight, then each destination node must have P*M buffer entries. The drawback with this mechanism is that it leads to an inefficient, area-hungry design because the buffer utilization is usually very low.

The destination node may instead allocate N credits, one for each of its receiving buffers. The source nodes need to share the N credits. The simplest way to share the credits amongst S distributed sending agents is to give each agent N/S credits for the receiving agents buffers. This promotes fairness amongst the agents, but does not handle imbalanced demand from the agents optimally. For example, when a single agent has many messages to send, and the others have none, the single agent is limited to using N/S credits, which will limit the message bandwidth from the agent.

DETAILED DESCRIPTION

In one embodiment a semiconductor chip including processors, an address space shared between the processors, may include a bidirectional ring interconnect to couple together the processors and the shared address space. In accordance with one embodiment of the present invention, the processors may include CPUs and the address space may include a large shared cache Embodiments may also provide a method for selecting the direction on the bidirectional ring interconnect to transport packets between the processors and the shared address space. The method may include calculating the distance between a packet's source and destination in a clockwise direction and the distance in a counterclockwise direction, determining in which direction to transport the packet based on the calculated distances, and transporting the packet on the ring corresponding with and in the determined direction.

Figure 1:
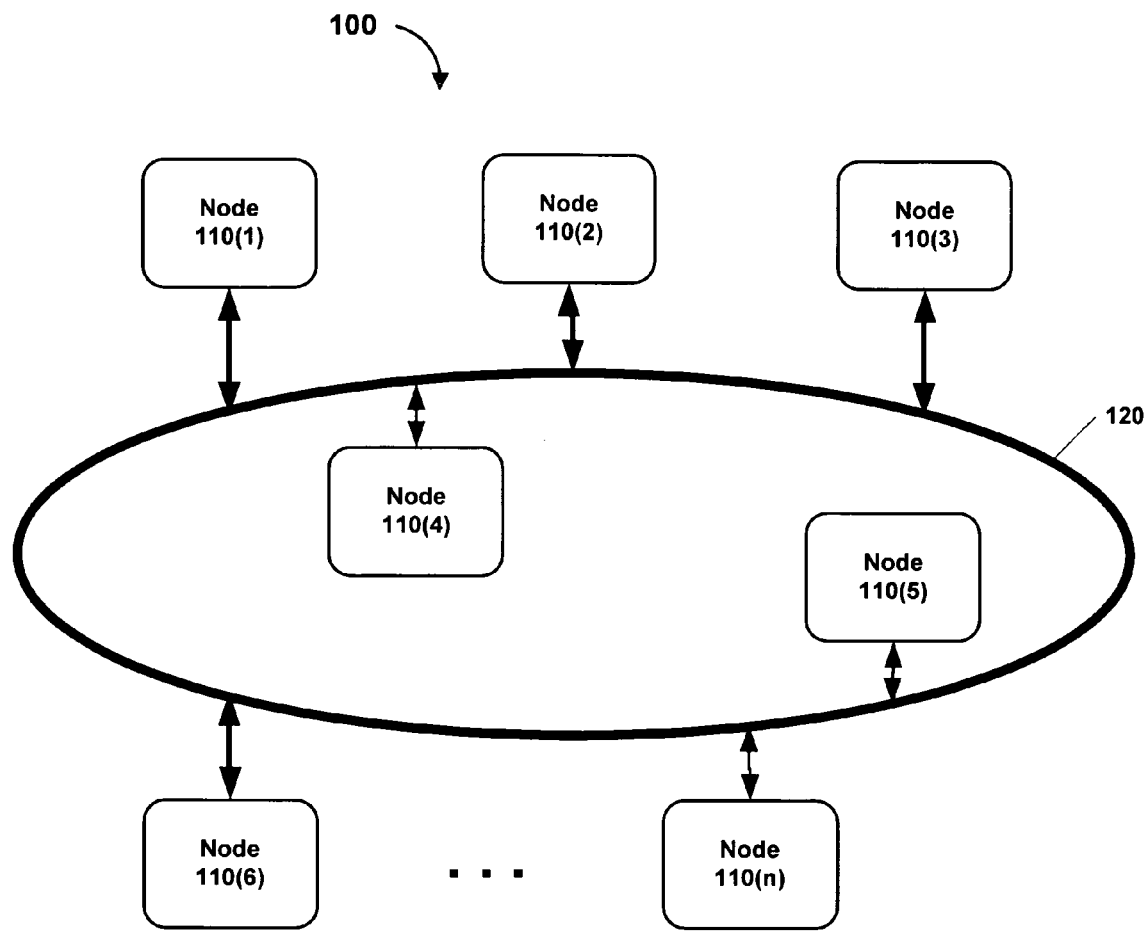
FIG. 1 depicts a semiconductor chip including multiple nodes coupled to a single bidirectional ring interconnect, in accordance with an embodiment.

FIG. 1 is a semiconductor chip including multiple nodes coupled to a bidirectional ring interconnect, in accordance with an embodiment to the present invention. Nodes 110(1) through 110(n) may be connected to bidirectional ring interconnect 120 at various access points or stops. Packets may travel between nodes 110(1) through 110(n) on interconnect 120 in either a clockwise or counterclockwise direction.

Nodes 110(1) through 110(n) may include a processor, cache bank, memory interface, global coherence engine interface, input/output interface, and any other such packet-handling component found on a semiconductor chip.

In FIG. 1, in an embodiment of the present invention, nodes 110(1) through 110(n) may be implemented as cache bank nodes by logically dividing a single large shared cache into subsets. Each cache bank node may include a portion of the address space in the single cache, and may independently service block requests (read, write, invalidate, etc) for the portion of the address space in the single cache. On interconnect 120, each cache bank node may have its own access point or stop.

In FIG. 1, interconnect 120 may include multiple unidirectional wires (not shown), where a first set of the unidirectional wires may transport packets in a clockwise direction and a second set may transport packets in a counterclockwise direction. Each set of unidirectional wires may have either a specific purpose (e.g., sending address commands) or a general purpose (e.g., supporting multiple packet types (address request, data, cache coherence protocol message, etc.)). Alternatively, each set of unidirectional wires may be designated to transport a single packet type.

Alternatively, in FIG. 1, interconnect 120 may include multiple bidirectional wires capable of transporting packets in both directions. In this alternate embodiment, the semiconductor chip may include switching logic to switch each wire to a desired direction to transport packets during a particular transaction.

Interconnect 120 may transport packets at various rates. For example, interconnect 120 may transport packets at a rate of one or more nodes per clock cycle or one node every two or more clock cycles. Many factors may determine the transport rate including the amount of traffic, the clock rate, the distance between nodes, etc. Generally, a node waits to inject a packet onto interconnect 120 until any packet already on interconnect 120 and at the node passes the node.

Figure 2:
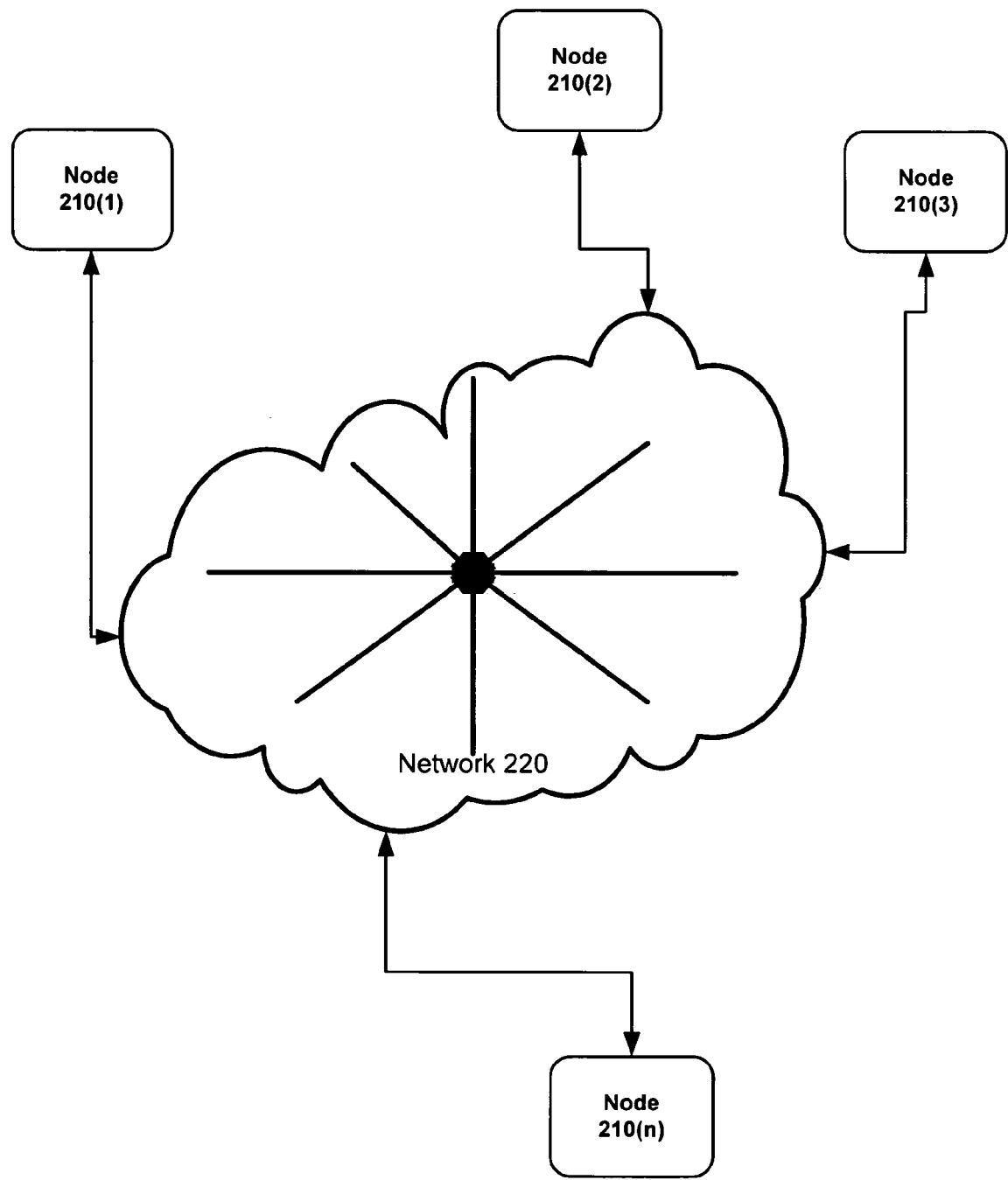
FIG. 2 depicts a network including multiple nodes coupled to a network of some arbitrary topology, in accordance with an embodiment.

Other embodiments may include an arbitrary network connecting nodes. FIG. 2 is a logical diagram of such a network 220, which may have any arbitrary topology such as a ring, hub and spoke, 2-D mesh, 2-D torus, star or other network topology, flat or hierarchical, as is known in the art. Alternatively network 220 may be a wireless (e.g. radio frequency, infra-red, etc.) network, or a hybrid wireless and wired network. Other variations on the structure and underlying functionality of the network are possible.

Multiple nodes coupled to multiple ring interconnects, in accordance with an embodiment of the present invention. Nodes 210(1) through 210(n) may be connected to network 220 at various access points or stops.

A credit based system to manage buffer availability at a receiver between senders may be implemented on a ring network such as that described in FIG. 1 in embodiments in a processor, other semiconductor device, or another circuit, or on a more general network of any fashion as depicted in FIG. 2 in embodiments in any networked environment. In one embodiment the sending agents or nodes may be processors in a multiprocessor system or cores in a multicore system, and the receiving agent or node may be a circuit, a cache, a memory or other logic of the system. In other embodiment the sending agents or nodes may be computers, processor based platforms, or other devices capable of sending data on a network such as the network of FIG. 2, and the receiving node or agent may similarly be a computer, a processor based system or platform, or another device capable of receiving data and buffering data in a memory or other form of data store such as a disk based medium, including magnetic or optical storage among many others as is known.

To improve the capability of such a credit system to manage imbalanced demand among the sending agents, credits may be distributed dynamically based upon demand from each agent. When designing a mechanism that dynamically distributes credits to agents based upon demand, the following attributes may be desired:

Credits tend to be allocated according to relative demand of the requesting agents, whereby agents demanding more resources get more credits.
  A largely idle requesting agent should not typically experience significant latency when an occasional request needs to be made.
  One or more agents should not be able to starve another agent of credits.
  Regardless of the prior amount of relative demand among the agents, when demand evens out, the allocation of credit will also even out.
  An occasional burst of activity from a single agent can utilize credits at the receiving agent in a stream (a fixed number of credits per cycle on the ring network) if the other agents are idle.

A dynamic credit allocation mechanism using a logical credit ring network that addresses the desirable attributes is used in an embodiment. Such a system is depicted at a logical level in FIG. 3 In the figure, a ring network 300 connects senders 310 to a receiver 330. The receiver has a set of buffers 320. Each sender and the receiver is a stop 340 on the logical credit ring network (ring or credit ring) at which packets traveling on the ring may be added to or removed from it. The logical ring network, 300 which routes among the distributed requesting agents, may carry tokens, or designated data packets, which serve as credits for the receiving agent's buffers. The distributed sending agents 310 can take credits off of the ring when they are needed. A sending agent 310 may also allow credits to go by, unaltered, if it does not need them, or it is being equitable to other agents. A sending agent in the embodiment can take and hold onto some credits to reserve them for future use. This may allow for low latency when a buffer is unexpectedly needed for a request. For example, in one embodiment, each sending agent can keep up to two credits in reserve, while allowing the other credits to rotate freely on the ring.

When a buffer 320 at the receiving agent 330 becomes available, the receiving agent then puts a valid credit on the credit ring. To provide fairness to the distributed sending agents 310, a newly released credit on the credit ring can be activated only at a certain stop 340, that is, a location of a sending agent, on the ring (if the credits were immediately active when the receiving agent put them on the credit ring, the first agent on the ring would then have an unfair advantage over the other agents, and could, in effect starve out the other agents). The credit is validated when the receiving agent puts the credit on the ring, but each slot on the ring can be activated at a certain stop on the ring. Agents must allow non-active valid credits to go by. In one embodiment, the returning credits will have activation points that guarantee that each agent gets "first try" at 1/N of the credits (were N is the number of agents).

The credit is, in this embodiment, a two bit token, with a bit that is set for "valid" and a bit that is set for "active". It may also contain a credit type, if a single ring is used for multiple resource types or receiving agents. The token may also contain a count of credits, allowing multiple credits to be carried in one slot.

The activation of credits can be done locally at each sending agent (a sending agent can activate a valid credit every 1/M cycles, where M is the number of stops on the credit ring). Alternatively, the sending agent can encode, for example, using an identifier for a specific sender, where the credit is to be activated and the sender at each stop can do a comparison.

Many other credit activation mechanisms can be used, including a random mechanism. In general, the processing of credits may be any known mechanism such that credits become active approximately at the same frequency at each stop along the network.

It is important to note that the credit ring network is a logical network. It may be implemented on a physical network that is itself a ring network, such as that depicted in FIG. 1, or it may be implemented on another type of network as depicted in FIG. 2. In some embodiments, a physical network implemented as a ring may be used to pass and activate credit tokens as described above, while another form of network may be used to transfer other types of data between nodes. Many variations on these configurations are possible.

Figure 3:
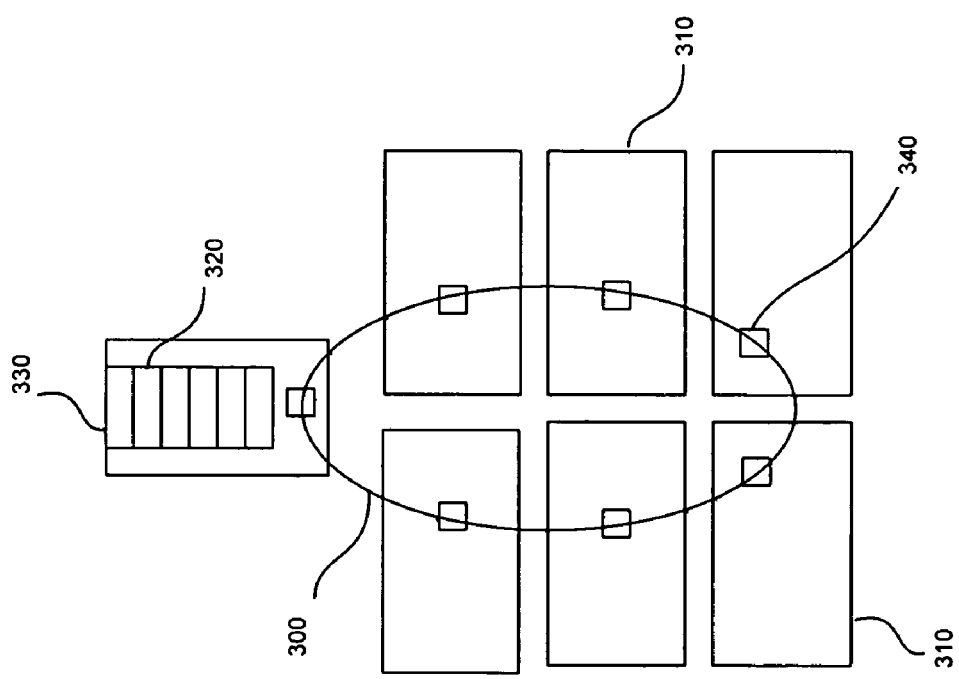
FIG. 3 depicts a logical credit ring network with senders and a receiver with buffers at a high level in one embodiment.
Figure 4:
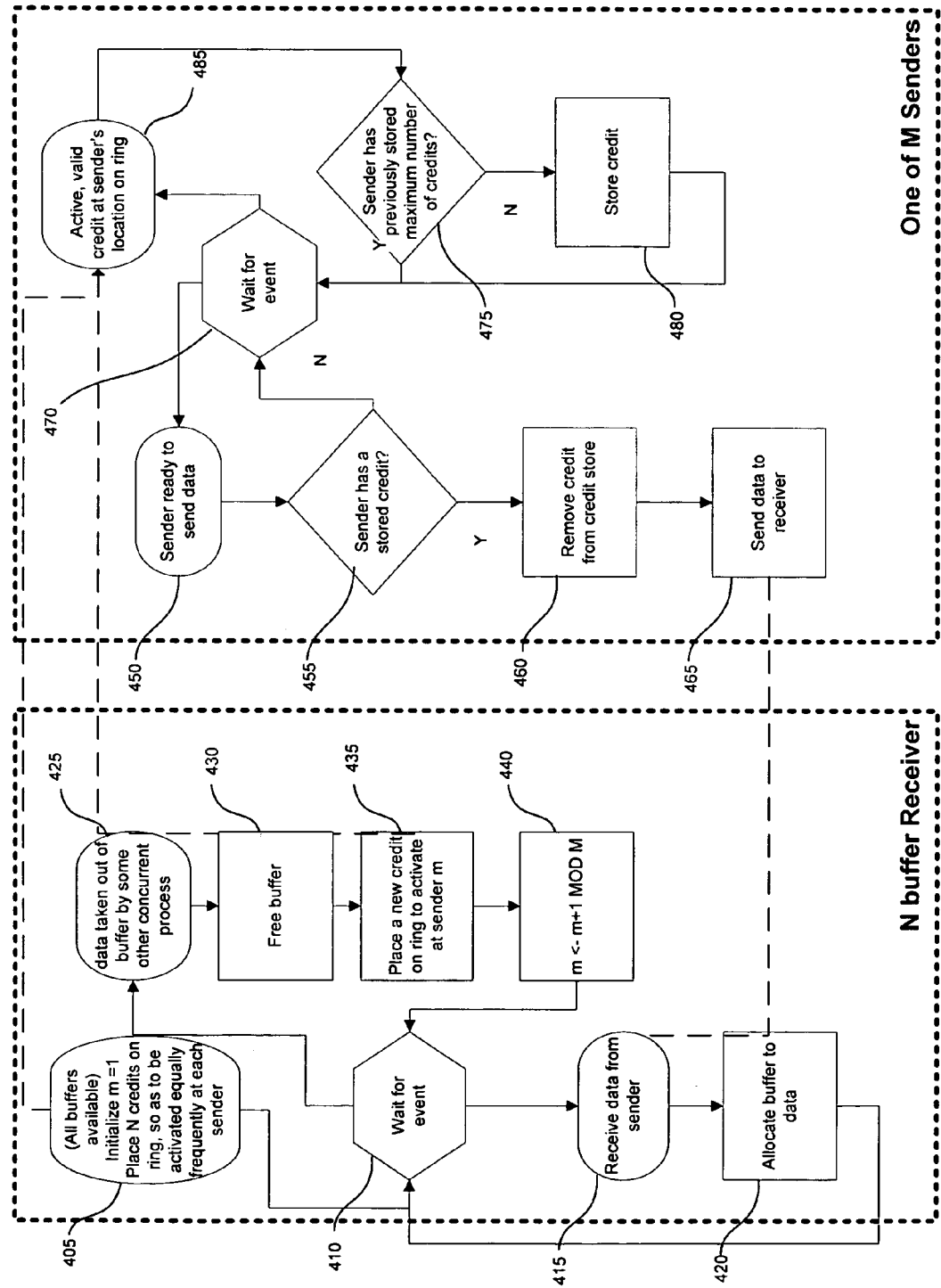
FIG. 4 depicts flow of processing in one embodiment.

FIG. 4 depicts in a flowchart the processing that may occur in an embodiment such as depicted in FIG. 3. In the figure, processing at a receiver and at a sender is shown. At a receiver, initially as at 405, N credits are placed on the credit ring, one for each buffer, and each credit is set up to activate at a specific location on the network such that each sender sees an activated credit at least N/M times. The buffer then waits for the next event, and/or performs other processing at 410. In general that would be a receipt of data from a sender which has used an active credit as at 485 and stored it, 475 and 480, and has then become ready to send data, 450. Once the sender has verified that it has a stored credit, 455, it may use the credit, 460 and send data to the receiver 465. After each store of a credit or a send of data, the sender enters a wait state or performs other processing at 470. Once the receiver receives data 415, it may allocate a buffer to the data, 420. The event at the receiver might also be that data is removed from the buffer by a data using process at 425, in which case the receiver places another credit on the network, 435 after freeing the buffer at 430. It may then update an index of the next stop on the network at which a credit is to be activated, m by incrementing it modulo M.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. An apparatus comprising:
    a logical ring network (ring);
    a plurality of nodes on the ring, each of the plurality of nodes comprising a sending agent (sender) on a data transmission network;
    a node on the ring comprising a receiving agent (receiver) on the data transmission network,
    the receiver comprising receiver logic to encode a sender identifier into a token and place the token on the ring, the token further comprising an indication of an activation status; and
    network logic to pass the token along the ring and to activate the token at the sender corresponding to the sender identifier based on a comparison performed at the sender by setting the indication of the activation status to a value indicating that the token is active at a location on the ring determined so that over a period of time, the token is activated in proximity to each sender at approximately the same frequency.

2. The apparatus of claim 1 wherein the receiver logic is further to place the token on the ring to indicate that the receiver is ready to receive data; the token further comprising an indication of a valid status; and the receiver logic is further to set the indication of the valid status to a value indicating that the token is valid prior to placing the token on the ring.

3. The apparatus of claim 1 wherein the network logic is further to activate a token every 1/M cycles where M is the number of senders on the ring.

4. The apparatus of claim 2 wherein each sender on the ring further comprises sender logic to intercept the token and subsequent to intercepting the token,
if the indication of activation status of the token is active, to do one or more of remove the token from the ring and set the valid status of the token to invalid; and
if the indication of activation status of the token is not active, to allow the token to continue travel along the ring without a change in the activation status of the token or in the valid status of the token.

5. The apparatus of claim 2 wherein the sender is to send data to the receiver over the data transmission network only if the sender has a token whose activation status is active and whose indication of valid status is valid.

6. The apparatus of claim 2 wherein the sender is further to store the token if the token's indication of activation status is active and if a predetermined number of tokens has not been previously stored by the sender.

7. The apparatus of claim 1 wherein the receiver further comprises a pool of buffers, each token comprises a credit for a fixed number of buffers; and the sender is further to send data to the receiver over the data transmission network for storage in one of the pool of buffers.

8. The apparatus of claim 7 wherein the pool of buffers has a fixed number, N, of buffers; the receiver has N tokens; and each token comprises a credit for one of the N buffers.

9. A processor based system comprising:
a logical ring network (ring) interconnecting processor nodes (nodes) of the system;
a plurality of nodes on the ring, each of the plurality of nodes further comprising a sending agent (sender) on a data transmission network;
a node on the ring to act as a receiver of data on the data transmission network, the receiver comprising receiver logic to place a token on the ring, the token further comprising an indication of an activation status; and
network logic to pass the token along the ring from each node to the next after the token is placed on the ring and to activate the token every 1/M times that a valid, non-active token passes by, where M is the number of senders on the ring, by setting the indication of the activation status to a value indicating that the token is active at a location on the ring determined so that over a defined period of time, the token is activated in proximity to each sender at approximately the same frequency.

10. The processor based system of claim 9 wherein the receiver logic is further to place the token on the ring to indicate that the receiver is ready to receive data; the token further comprises an indication of a valid status; and the receiver logic is further to set the indication of the valid status to a value indicating that the token is valid prior to placing the token on the ring.

11. The processor based system of claim 9 wherein the receiver logic is further to encode an identifier into each token and the network logic is to activate the token at the processing node corresponding to the identifier of the token.

12. The processor based system of claim 9 wherein each node on the ring further comprises sender logic to intercept the token and subsequent to intercepting the token,
if the indication of the activation status of the token is active, to do one or more of remove the token from the ring and set a valid status of the token to invalid; and
if the indication of the activation status of the token is not active, to allow the token to continue travel along the ring without a change in the activation status of the token or in the valid status of the token.

13. The processor based system of claim 12 wherein the sender logic is to send data to the receiver only if the sender has a token whose activation status is active and valid status is valid.

14. The processor based system of claim 12 wherein the sender logic is further to store the token if the token's indication of the activation status is active and if a predetermined number of tokens has not been previously stored by the sender.

15. The processor based system of claim 14 wherein the receiver further comprises a pool of buffers, each token comprises a credit for a fixed number of buffers; and the sender logic is further to send data to the receiver for storage in one of the pool of buffers.

16. The processor based system of claim 15 wherein the pool of buffers has a fixed number, N, of buffers; the receiver has N tokens; and each token comprises a credit for one of the N buffers.

17. A method comprising:
a receiver on a data transmission network placing a token comprising an indication of an activation status on a logical ring network (ring) to indicate that the receiver is ready to receive data, the receiver setting an indication of a valid status to a value indicating that the token is valid prior to placing the token on the ring;
passing the token along the ring after the token is placed on the ring;
determining a stop on the ring for activation of the token so that over a defined period of time, the token is activated in proximity to each sender of the data transmission network on the ring at approximately the same frequency; and
activating the token every 1/M times that a valid, non-active token passes, where M is the number of senders on the ring, by setting the indication of the activation status to a value indicating that the token is active at the determined stop.

18. The method of claim 17 further comprising encoding a sender identifier into each token and activating the token at a sender corresponding to the sender identifier of the token.

19. The method of claim 17 further comprising intercepting the token and subsequent to intercepting the token,
if the indication of the activation status of the token is active, performing one or more of removing the token from the ring and setting the valid status of the token to invalid; and
if the indication of the activation status of the token is not active, allowing the token to continue travel along the ring without a change in the activation status of the token or in the valid status of the token.

20. The method of claim 19 wherein the receiver further comprises a pool of buffers, each token comprises a credit for a fixed number of buffers, further comprising a sender sending data to the receiver for storage in one of the pool of buffers.

21. The method of claim 20 wherein the pool of buffers has a fixed number, N, of buffers; the receiver has N tokens; and each token comprises a credit for one of the N buffers.

22. A machine readable medium having stored thereon data that when accessed by a machine causes the machine to perform a method, the method comprising:
- a receiver placing a token comprising an indication of an activation status and an indication of a valid status on a logical ring network (ring);
- passing the token along the ring;
- determining a stop on the ring for activation of the token; and
- activating the token every 1/M times that a valid, non-active token passes, where M is the number of senders on the ring, by setting the indication of the activation status to a value indicating that the token is active at the determined stop.

23. The machine readable medium of claim 22 wherein the method further comprises the receiver placing the token on the ring to indicate that the receiver is ready to receive data.

\* \* \* \* \*